United States Patent Office 3,780,151
Patented Dec. 18, 1973

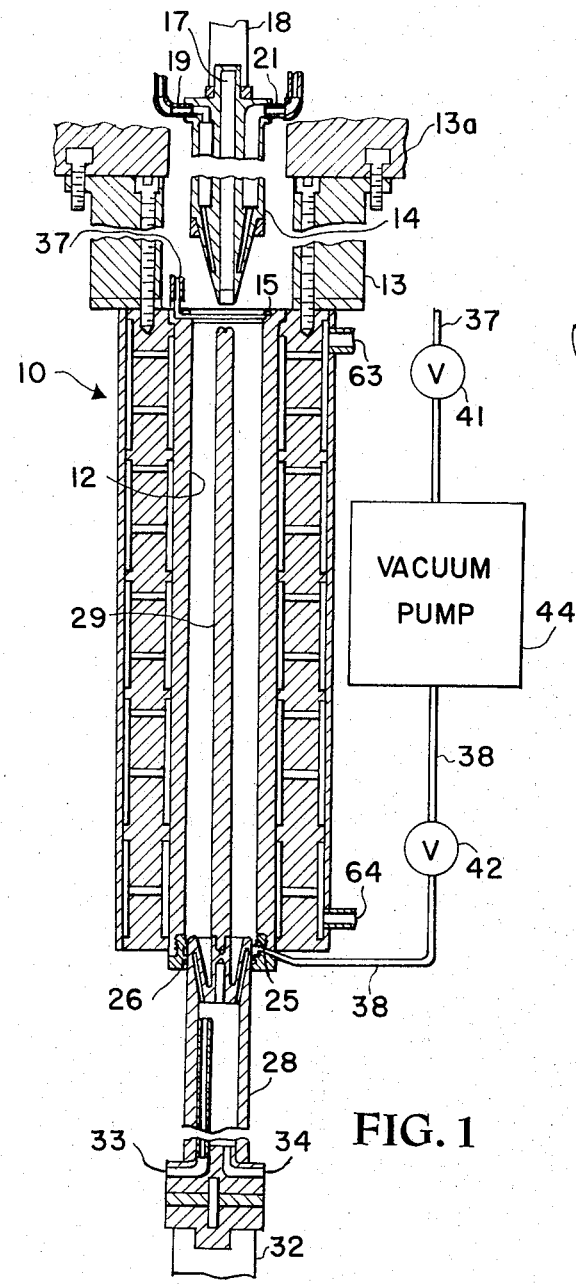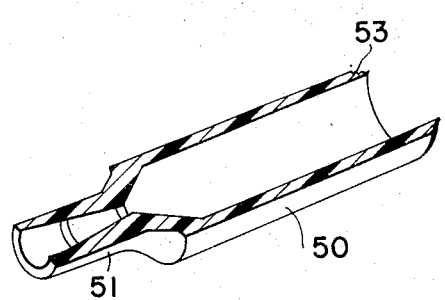
FIG. 7
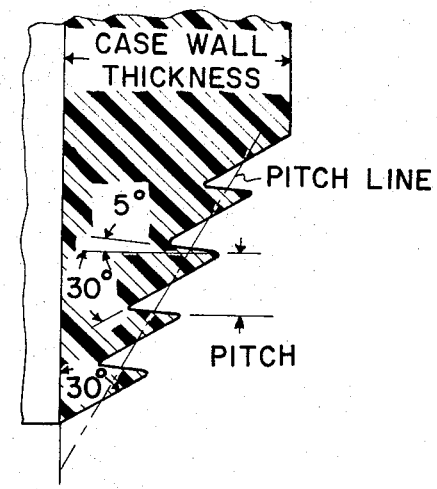
FIG. 8
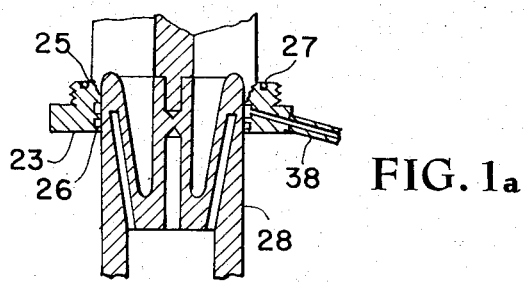
INVENTOR.
WILBER C. HEIER

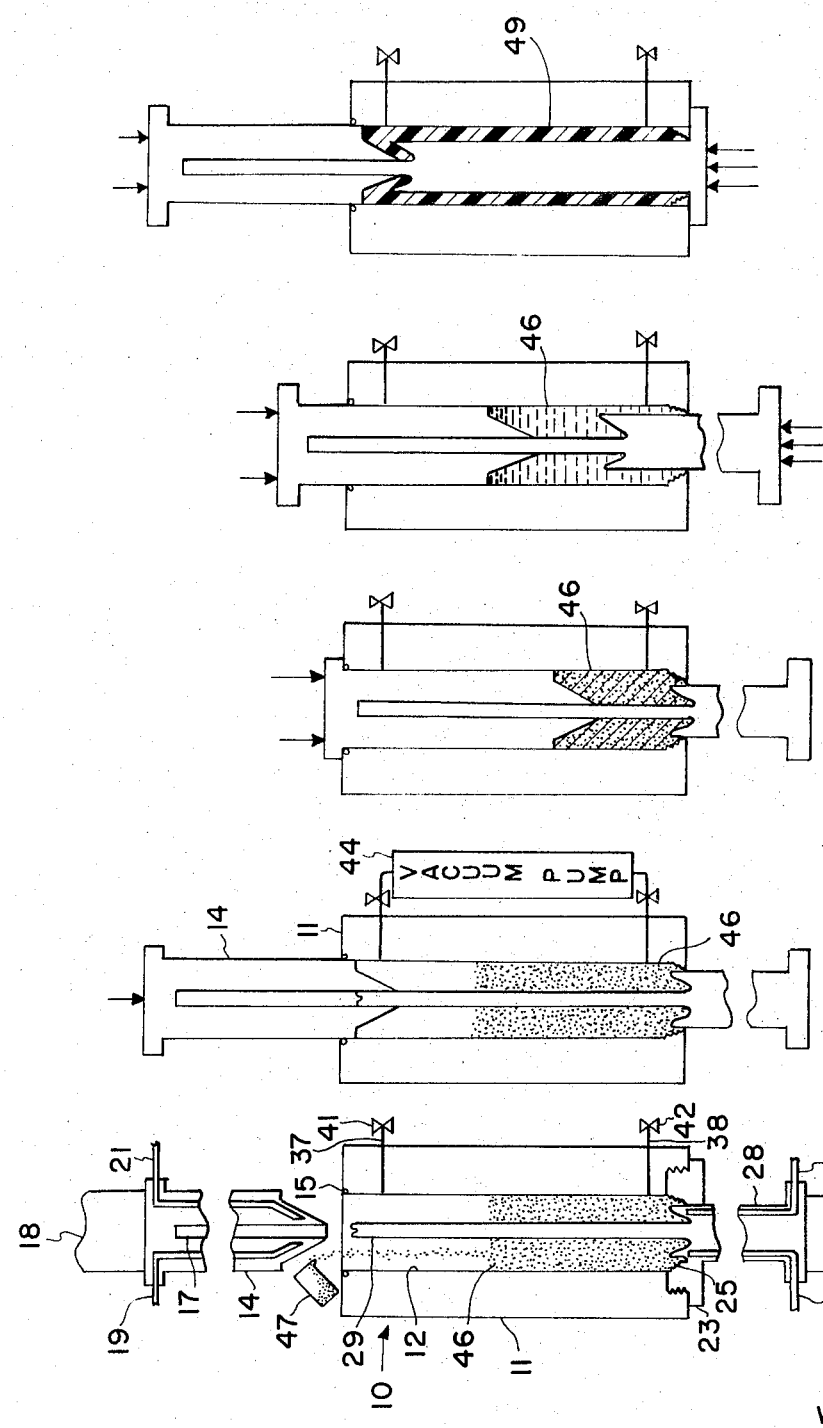

3,780,151
EVACUATED, DISPLACEMENT COMPRESSION MOLDING
Wilbur C. Heier, Hampton, Va., assignor to the United States of America as represented by the Administrator of the National Aeronautics and Space Administration
Filed Nov. 11, 1971, Ser. No. 197,689
Int. Cl. B29c 25/00; B29d 1/00; B29g 1/00
U.S. Cl. 264—102
14 Claims

ABSTRACT OF THE DISCLOSURE

A process of molding long thin-wall tubular bodies from thermosetting plastic molding compounds wherein the tubular body lengths may be several times the diameters. The process is accomplished by loading a predetermined quantity of molding compound into a female mold cavity closed at one end by a force mandrel. After closing the other end of the female mold with a balance mandrel, the loaded cavity is evacuated by applying a vacuum of from one-to-five mm. pressure for a period of fifteen-to-thirty minutes. The mold temperature is raised to the minimum temperature at which the resin constituent of the compound will soften or plasticize and a pressure of 2500 p.s.i. is applied by the balance mandrel on the load within the cavity for a period of from five-to-fifteen minutes. While maintaining this vacuum, temperature, and balance mandrel pressure, a pressure of approximately 3500 p.s.i. is applied by the force mandrel onto the compound load to thereby displace the balance mandrel. This normally requires three-to-five minutes for the force mandrel to complete its stroke. The mold temperature is then increased to and maintained at 300–350° F. for a period of thirty-to-sixty minutes while maintaining the vacuum and pressure of both mandrels. The force mandrel is force-cooled to effect its thermal shrinkage for easy removal from the tubular article which is left in the female mold. The balance mandrel is then used to push the molded tubular article from the female mold. A mold insert may be attached to the female mold to permit molding of exterior spiral threads on one end of the molded article.

ORIGIN OF THE INVENTION

This invention was made by an employee of the National Aeronautics and Space Administration and may be manufactured and used by or for the Government of the United States of America without the payment of any royalties thereon or therefor.

BACKGROUND OF THE INVENTION

Long, thin-wall tubular bodies formed from thermosetting compounds have proved useful in making rocket motors and the like. The present invention provides a method of molding of larger and thinner bodies than conventional methods while maintaining superior physical properties.

The concept of integrally molded case and nozzle rocket motors has been successfully demonstrated by the present invention. Since a large number of military rockets and meteorological sounding rockets are flown each year, highly automated processes of producing these motors, such as molding, become effective. Rocket motors prepared by the present process cost only about one-third of that of conventional rocket motors formed with a metal case and separate nozzle. These savings result primarily from reduced labor costs with expensive production manpower being saved as well as savings in equally expensive quality control and inspection labor.

During fabrication by the present invention, the plastic rocket nozzle is molded integrally with the case and thereby eliminates the separate operation of fabricating and installing a nozzle. Both the metal and plastics motor cases must be cleaned on the interior surfaces thereof for adequate bonding of the adjacent propellant material. The metal cases require insulation but each plastics case formed by the present process serves as its own insulator and the propellant is cast directly to the case wall with adequate bonding being achieved. Thus, the insulation liner, and the associated linear curing operation normally required for metal cases are eliminated for the plastic cases produced by the present invention.

It is therefore an object of the present invention to provide a novel evacuated, displacement, compression molding process for producing long thin-wall tubular bodies.

Another object of the present invention is a process for molding rocket motor cases having an integrally formed nozzle thereon.

Another object of the present invention is a process of molding cylindrical rocket motors having lengths many times their diameters and physical property characteristics in excess of those normally associated with high strength thermosetting plastics.

Another object of the present invention is a low cost process for producing rocket motor cases having integrally formed rocket nozzles.

An additional object of the present invention is a process for molding spiral buttress threads on a simultaneously molded tubular member.

The foregoing and other objects of the present invention are attained by providing an elongated female mold having a longitudinally extending cavity therethrough of the diameter and of at least the length of the tubular body to be molded. An elongated balance mandrel of substantially the same diameter as the female mold cavity is adapted to be slidably and sealingly received by one end of the female mold cavity. The opposite end of the female mold cavity is provided with an open insert having a tapered and threaded internal surface. A force mandrel is provided slidably and sealingly received by this tapered insert with the outside diameter of the force mandrel being spaced from the internal diameter of the female mold cavity a distance equal to the desired thickness of the final molded body. For molding, the female mold is positioned vertically with the spiral threaded insert disposed at the base thereof. After inserting the force mandrel in the cavity a sufficient distance to form a seal therewith, a preweighed amount of phenolic resin or other suitable molding composition is poured into the open end of the mold cavity and the balance mandrel in inserted therein a sufficient distance to close and effect a seal with that end of the mold cavity. A vacuum is then applied to the closed and loaded cavity to remove any entrapped air and moisture in the cavity and composition. Heat is then applied to both mandrels to raise the temperature of the mold cavity to approximately 400° K. or 261° F. The balance mandrel is then moved down within the cavity to press the compound load with 17.2 meganewtons per square meter or 2500 pounds/square inch. The pressure and temperature causes the compound load to plasticize and become hydrostatic. Next, the force mandrel is pushed upward on the compound sufficiently to overcome the downward force of the balance mandrel which is maintaining an effective pressurue of 17.2 meganewtons/square meter. This action causes the balance mandrel to be expelled by the force mandrel and the plasticized compound is displaced to its final form. The force mandrel pressure of approximately 3500 p.s.i. is maintained while the compound is cured at 420° K. or 300° F. for approximately forty-five minutes. After curing, the mandrels are cooled and the molded tubular article is recovered. The face configuration of the balance and force mandrels dictate the shape of one end of the molded body which may be either in the shape of an integrally formed or a submerged nozzle. The other end of the molded article is formed with external spiral buttress threads which facilitates the attachment of an end cap or the like onto the article.

BRIEF DESCRIPTION OF THE DRAWINGS

A more complete appreciation of the invention and many of the attendant advantages thereof will be better understood as the same becomes more apparent by reference to the following detailed description when considered in connection with the accompanying drawings, wherein:

FIG. 1 is a sectional view, part schematic, of the molding apparatus employed in the present invention when molding a rocket motor casing having an integrally formed submerged nozzle;

FIG. 1a is an enlarged view of the thread forming insert employed in the mold shown in FIG. 1;

FIGS. 2-6 are schematic illustrations of the molding apparatus shown in FIG. 1 during the molding process steps and with parts omitted therein for clarity;

FIG. 7 is a section of a molded rocket motor case and nozzle formed by the present invention when employing different end configurations for the force and balance mandrels shown in FIGS. 1-6 so as to produce an external nozzle;

FIG. 8 is an enlarged view of the spiral buttress threads formed on the end of the rocket motor cases formed by the present invention.

Referring now to the drawings, wherein like reference numerals are employed to represent like parts throughout the several views and more particularly to FIG. 1, there is shown the molding apparatus employed in the present invention and generally designated by reference numeral 10.

Figure 9:
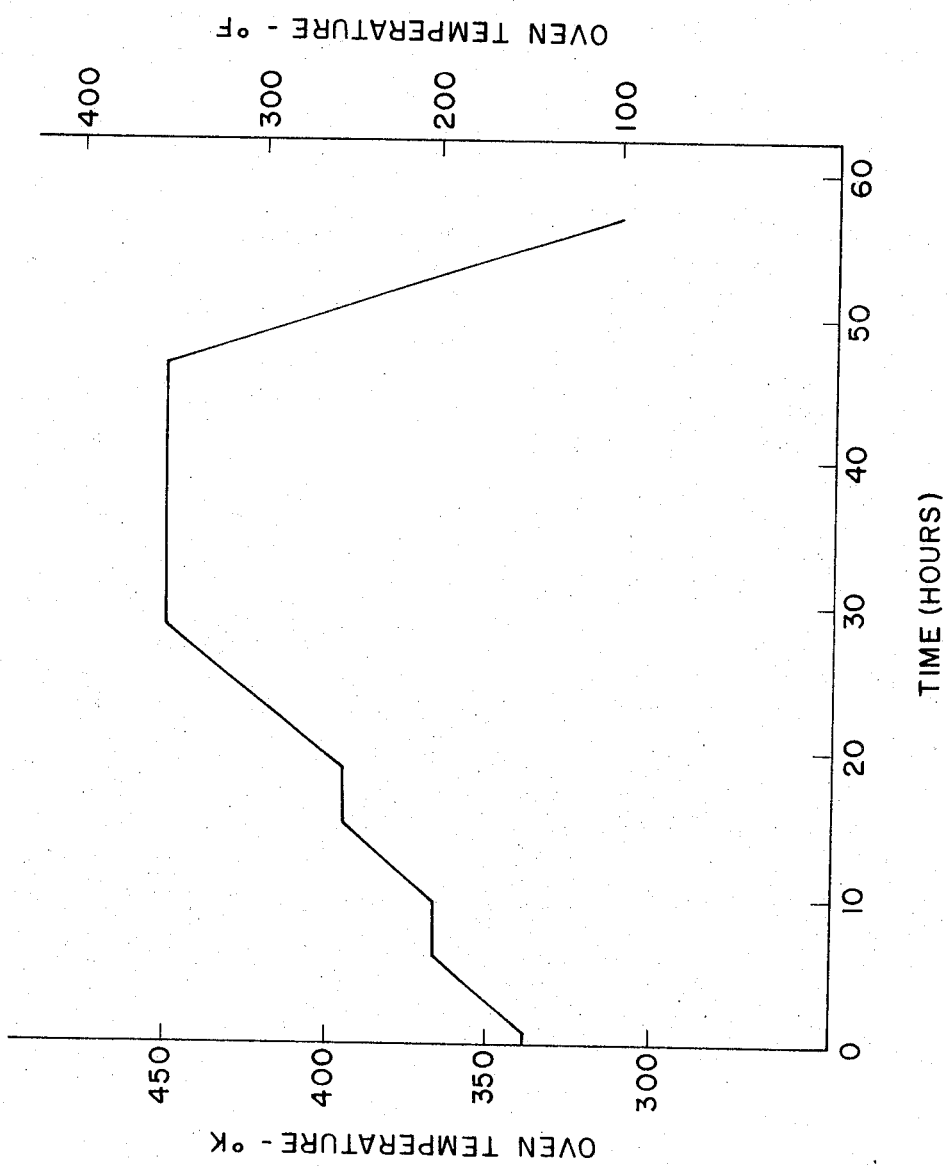
FIG. 9 is a graph showing the post cure profile of the rocket motor cases formed by the present invention.

Molding apparatus 10 includes an elongated female mold 11 having a cavity 12 extending therethrough. Mold 11 is connected to a suitable bolster 13 at one end thereof to provide attachment to a stationary press plate 13a as is conventional in compression molding apparatus. Female mold 11 is positioned vertically, as shown, for practice of the present invention. An elongated balance mandrel 14, substantially the same diameter as cavity 12, is adapted for sliding movement within cavity 12. An O-ring seal 15 is provided adjacent the end of cavity 12 to effect sealing of cavity 12 when balance mandrel 14 is received therein. Balance mandrel 14 is also provided with an elongated central bore 17 extending along the major length therein as will be further explained hereinafter. Balance mandrel 14 is adapted for connection with a top ram 18 at the closed end thereof. An inlet conduit 19 is received in balance mandrel 14 leading to a heating passageway within the mandrel and exiting at outlet conduit 12 and serves to conduct heating fluid through the mandrel.

The bottom end of female mold 11 is provided with a tubular threaded insert 23 extending into cavity 12 (FIG. 1a). The internal surface of insert 23 is tapered and provided with spiral buttress threads 25 along the length of the taper. Two O-ring seals 26 and 27 are provided within insert 23. An elongated force mandrel 28 of such diameter as to effect sealing of cavity 12 with O-ring 26 is slidably received within insert 23 and the base of cavity 12. Force mandrel 28 is provided with an elongated extension 29 of substantially the same length and configuration as the elongated central bore 17 in balance mandrel 14. A bottom ram 32 connects with force mandrel 28 in a conventional manner. Rams 18 and 32 lead to suitable actuators which may be hydraulic, pneumatic or otherwise energized in a conventional manner, to exert the desired force on the respective mandrels 14 and 28. An inlet conduit 33 is received within the head of force mandrel 28 leading to a passageway within the mandrel and exiting at outlet conduit 34 and serving to conduct heating fluid through the mandrel.

A pair of vacuum conduits, schematically shown as lines 37 and 38, connect the interior of cavity 12 to a pair of valves 41 and 42 leading to a suitable vacuum pump schematically shown as block 44.

Loading of the cavity 12 with the compound to be molded is accomplished, as shown in FIG. 2, by removing mandrel 14 a sufficient distance from cavity 12 to permit the pouring of a preweighed quantity of thermosetting material 46 from a suitable container 47 into the cavity. Other steps in the process are illustrated in FIGS. 3-6 and a detailed explanation of the various molding process soeps will be further explained hereinafter.

The final molded rocket motor casing as designated by reference numeral 49 (FIG. 6) is of the submerged nozzle type while in FIG. 7 there is shown a rocket motor casing 50 having an integrally formed conventional external nozzle. The spiral buttress threads 53 on motor casing 50 are formed as described with reference to FIGS. 1-6 and facilitate the attachment of a motor end cap to casing 50 after loading of the casing with a propellant.

A more detailed illustration of threads 53 is shown in the enlarged view thereof in FIG. 8. As shown therein the threads are formed with an approximate 30° pitch with respect to the longitudinal center axis of motor casing 50.

Referring now to FIG. 9, the post cure profile of an exemplary rocket motor casing formed of phenolic resin according to the present process is shown. As shown therein, the normal post cure for a specific phenolic resin casing is approximately fifty-seven hours with a temperature range of approximately 375–450° K. (175–350° F.). Other molding compositions would have a similar, but different, post cure profile.

MOLDING PROCESS

The molding process of the present invention is best described with reference to FIGS. 1-6. Initially force mandrel 28 is moved up to seal with O-ring 26 in tapered insert 23 and a controlled amount of thermosetting resin 46 is loaded into the top of cavity 12 from container 47 (FIGS. 1-2). No hand or other packing of resin 46 is employed. The balance mandrel 14 is then moved down into cavity 12 to seal with O-ring 15 in cavity 12 (FIG. 3). Valves 41 and 42 are then opened and vacuum pump 44 started to evacuate any air and moisture from the resin and cavity 12. A vacuum of from one to gve mm. mercury pressure is maintained for fifteen-to-thirty minutes. All cavity surfaces are then heated to approximately 400° K. (261° F.) by circulating a heating fluid through inlets 19 and 33 of the respective mandrels 14 and 28, as well as around the exterior of mold 11 through inlet 63. The heating fluid exits through the respective outlets 21, 34 and 64. This heating fluid may be steam, hot oil or any other conventional mold heating fluid.

Balance mandrel 14 is then moved down to press the heated molding compound with 17.2 meganewtons per square meter (2500 pounds/square inch) (FIG. 4). The temperature of the compound is maintained in the range of 250–275° F. which, along with the pressure on the compound, causes the compound to plasticize and become hydrostatic with any entrapped air being continuously removed by the vacuum system. Force mandrel 28 is then pushed upward on compound 46 with sufficient force to cause expelling of balance mandrel 11 (FIG. 5). This causes displacement of compound 46 into its final form and force mandrel 28 continues displacing the compound and expelling balance mandrel 14 until the stroke thereof is complete (FIG. 6) thus producing the desired motor-nozzle configuration 49. The pressure is maintained on both balance mandrel 14 and force mandrel 28 and the mold temperature is increased to approximately 425° K. (300° F.) and maintained for approximately 45 minutes to effect curing of the molded rocket nozzle 49.

After this curing step, the flow of heating fluid is ceased and a flow of air, cold water or other suitable cooling fluid, is admitted through inlet conduit 33 through force mandrel 28 and out the outlet conduit 34. This forces cooling and thermal shrinkage of mandrel 28, and its size slightly reduces within the motor nozzle configuration. This is turn facilitates and permits extraction of the mandrel. The threaded insert 23 is then removed from mold 11 to expose the molded spiral buttress threads on the rocket motor casing. Removal of the final molded configuration is then easily accomplished through the bottom of cavity 11.

The molded configuration 49 is then placed in a suitable oven for post-curing at the time and temperatures as shown in the graph illustrated in FIG. 9. After post-curing, the motor-nozzle is ready for loading with propellant and closing by a suitable end cap (not shown) screwed onto the spiral buttress threads 53. Due to the pitch of the molded threads the end cap remains tight on the motor casing. Specifically the basic form of the molded threads 53 includes a pressure flank angle of 5°, a trailing flank angle of 30°, a pitch line on a 30° angle of taper, equal radii at the roots of the internal and external threads and a crest radius which is slightly larger than the root radius. The strength of the molded spiral buttres threads is much higher than molded straight threads because the form presents an open aspect to the molding compound which results in reduced pressure decay and improved thread fillout. Also, when molding a straight thread the mold must be perfect or split in order to remove the molded part while the removal of the insert 23 from the molded part is relatively simple since the threads are fully engaged only in the final increment of travel. It is thus seen that the molded spiral buttress thread formed produces a high strength, self-sealing joint for connecting molded parts that eliminates the need for spigot fits or other indexing mechanisms.

No specific dimensions have been set forth in the description since these specifics are not deemed essential to the process. Example rocket motors which may be produced by the present invention are molded sounding rocket motors 1.83 meters (6 feet) long, 12.7 centimeters (5 inches) in external diameter and with a case wall thickness of .762 centimeter (.3 inch). These motors are capable of boosting a 31.8 kilogram (7 pound) payload to an apogee of 70 kilometers (230,000 feet).

Motors of this type have been successfully molded by the present process utilizing an asbestos phenolic resin having the inherent physical property characteristics of plasticizing and becoming hydrostatic when heated to approximately 400 K. and pressurized with approximately 17.2 meganewtons/square meter pressure and thereafter becoming cured into a solid state when heated to approximately 420° K. for approximately 45 minutes. Resins of this type are available, for example, from Johns-Manville, P.O. Box 159, Manville, N.J., under their labels designated as Thermomix-700. Thermomix-705, and Thermomix-720. Other phenolic resins available from various manufacturers under different labels are suitable as the molding composition in the present invention and require only appropriate adjustments in the molding temperatures, pressures, and post curing.

As apparent from a cursory examination of FIGS. 6, and 7, the selection of either an external nozzle (FIG. 7) or a submerged nozzle is easily made by selecting the proper shape for the ends of the balance mandrel 14 and the force mandrel 28.

The selection of the exact quantity of molding compound is readily made by filling the mold cavity formed between the balance and force mandrels, when the force mandrel is at full stroke with water; weighing the quantity of water used, multiplying the weight of the water by the specific gravity of the final molded article desired, and using this quantity of the molding compound employed.

Optimum post-curing of the molded motor is important toward achieving the maximum tensile strength of the material. Insufficient post-curing results in a plastics case with lower tensile strength properties because the resin does not reach its full polymerization, while excessive post-curing also results in a lower tensile strength because the resin is overstressed and makes the material more brittle.

There are many advantages of the present invention over conventional molding techniques. For example, the molding apparatus is engineered for a rapid evenly dispersed and finely controlled input of thermal energy to expedite the uniform, two-stage temperature rise and dwell time of the molding compound. It is very important to resultant molded physical properties for the compound to be uniformly viscous during the displacement or formation phase and to polymerize evenly throughout. Pressure decay in a molding process is due to the inherent drop-off in molding pressure from the point of origin, e.g., the force member, to the extremes of the cavity containing the molding composition. The cause and degree of this drop-off or reduction is directly attributable and in proportion to cavity wall expanse, cavity wall finish, bridging of fillers and reinforcements, and the magnitude and configuration of the flow distance involved. The primary deterrent to pressure decay in the present process is the reduction in active friction planes, relative to cavity wall expanse, that are necessary for formation of final configuration 49. Because of the specific process employed herein, the reduction in active friction planes is more than 60% of that of a comparable shape in a conventionally designed molding process. This pressure decay is further reduced by the compound 46 becoming hydrostatic as it plasticizes at the beginning of the heat and formation cycle. This feature permits the use of hydrodynamic forces to reduce resistance for the displacement of the compound into its final formation. The cycle time thus saved assures a more complete hydrostatic pressure in the final shape before the compound advances into the "C" or hardened stage. By contrast, in a conventional molding process, the force mandrel must push a low-density partially plasticized material to the cavity extremes before hydrostatic pressure can be developed. The mold cavity 12 employed in the present invention is also sufficiently large, without employing undue mold length, for accommodating the compound without prepackaging which permits the easy removal of air and moisture from the bulk compound, these contaminants which are inherently present in prepacked compounds, if not removed will prevent molding material from achieving the higher densities and strengths necessary for rocket motor cases.

Additionally, conventional molding processes must necessarily generate a flow front which is the initial portion of the viscous compound as it is forced into the cavity. A flow front is defined as the total forepart or crest of the plasticized compound as it is being distributed with high pressure throughout the cavity and is considered an inescapable adjunct of most conventional mold designs and molding techniques, including injection molding. Flow fronts constitute a molding hazard because they are difficult to control and random orientation of reinforcement is dependent upon the front being controlled to an uninterrupted termination at the cavity extremes. Examples of mold and molding pecularities that cause loss of control include variable density profiles, agglomerates of reinforcement, nonuniform intercavity volumes, and nonuniform cavity wall finishes. Any one or all of these can initiate a localized halt of the front followed by a flanking movement, and, for the duration of the flanking action, the reinforcement and resin are precipitated into interfacial planes creating areas with unidirectional structural properties and weld marks resulting in residual stress with accompanying warpage of the final product. The present process eliminates the flow front and its associated problems since the material becomes hydrostatic before the molding pressures of the force mandrel is employed.

Suitable nozzle inserts of graphite or the like may also be integrally molded with the motor case-nozzle formed by the present invention by placing the insert at the end of the mandrel forming the interior nozzle configuration prior to the beginning molding operations.

Although the invention has been described relative to the specific advantages pointed out above, other uses and advantages will be readily apparent to those skilled in the art. Additionally, although the invention has been described relative to a specific configuration for rocket motors and integrally formed nozzles, it is not so limited and the described process may be employed to produce any form of thin-walled tubular bodies.

Obviously, many modifications and variations of the present invention are possible in the light of the foregoing teachings.

What is claimed as new and desired to be secured by Letters Patent of the United States is:

1. A method of molding long, thin-wall tubular bodies from thermosetting plastic molding compounds comprising the steps of:
   (a) providing an elongated female mold having a cavity extending therethrough and being of at least the length of the tubular body to be molded, one end of the female mold cavity being slightly tapered inwardly,
   (b) providing an elongated balance mandrel of substantially the same diameter of and slidably received by the female mold cavity, said balance mandrel having an elongated central bore extending along the major length therein,
   (c) providing an elongated force mandrel of substantially the same diameter as the smallest end of tapered portion of the female mold cavity and slidably received by the end of the female mold cavity having the tapered end, said force mandrel being provided with a centrally disposed projection of substantially the same length and configuration as the elongated central bore disposed in said balance mandrel and adapted to be received thereby, said force mandrel when received within said female mold cavity being spaced from the cavity a distance equal to the wall thickness of the tubular body to be molded,
   (d) positioning the female mold so that the cavity therethrough extends vertically with the tapered end thereof at the base,
   (e) inserting the force mandrel into the base of the female mold cavity a sufficient distance to close and seal the base end of the cavity,
   (f) loading a controlled amount of thermosetting compound into the mold cavity from the top thereof, said thermosetting compound having the inherent physical property characteristics of plasticizing and becoming hydrostatic when heated to approximately 400° K. and pressurized with approximately 17.2 meganewtons/square meter pressure and thereafter becoming cured into a solid state when heated to approximately 420° K. for approximately 45 minutes,
   (g) inserting the balance mandrel into the top of the female mold cavity to close and seal the cavity,
   (h) applying a vacuum to the closed cavity of from one to five mm. pressure for 15-30 minutes,
   (i) heating all cavity surfaces to approximately 400° K. (261° F.) while maintaining the vacuum therein,
   (j) while maintaining the temperature and vacuum condition of steps (h) and (i) forcing the balance mandrel downward to press the thermosetting compound with 17.2 meganewtons/square meter (2500 pounds/square inch) pressure to cause the thermosetting compound to plasticize and become hydrostatic,
   (k) forcing the force mandrel upward sufficiently to overcome the downward pressure of 17.2 meganewtons/square meter maintained on the balance mandrel to thereby displace the thermosetting compound and expel the balance mandrel upward until the force mandrel stroke is completed;
   (l) while maintaining the mold pressure, increasing the mold temperature to approximately 420° K. (300° F.) and maintaining this temperature for approximately 45 minutes to effect curing of the molded compound;
   (m) cooling the mold and removing the force and balance mandrels to recover an elongated thin-wall tubular body.

2. The method of claim 1 wherein the molded elongated tubular body is a rocket casing and including the steps of molding the rocket nozzle integral with one end of the elongated rocket casing.

3. The method of claim 2 wherein threads are molded on the other end of the elongated rocket motor casing to facilitate the attachment of a threaded head for the casing.

4. The method of claim 1 wherein the thermosetting compound is a phenolic resin and including the step of post curing the recovered elongated thin wall tubular body at a temperature of 100–350° F. for at least fifty-seven hours.

5. The method of claim 1 including the step of providing spiral buttress threads over the length of the tapered surface within the elongated cavity in the female mold to thereby mold spiral buttress threads on the tapered surface of the recovered elongated tubular body.

6. The method of claim 5 wherein the mold for the spiral buttress threads are provided on an insert that is received by the female mold.

7. The method of claim 6 wherein the pitch line formed by the molded spiral buttress threads is approximately 30° with respect to the longitudinal center line of the elongated tubular body.

8. A method of molding long, thin-wall tubular bodies from thermosetting plastics molding compounds comprising the steps of:
   (a) providing an elongated female mold having a cavity extending therethrough of at least the length of the tubular body to be molded;
   (b) providing a tubular insert for one end of the mold cavity, said tubular insert being formed with an inwardly tapered surface and having spiral buttress threads formed on the interior tapered surface thereof;
   (c) positioning the female mold vertically so that the inwardly tapered insert portion is at the bottom thereof;
   (d) providing an elongated force mandrel of substantially the same diameter as the smallest internal diameter portion of the tapered insert and with an elongated projection thereon, said force mandrel when received within the female mold cavity being spaced from the cavity wall a distance equal to the wall thickness of the tubular body to be molded;
   (e) providing an elongated balance mandrel slidably received by the upper end of the female mold cavity and having a centrally disposed elongated bore extending along the major length thereof and adapted to receive the elongated projection extending from the force mandrel;
   (f) positioning the force mandrel into the base of the female mold cavity a sufficient distance to close and seal with the tapered insert disposed in the cavity;
   (g) loading a controlled amount of a thermosetting compound into the mold cavity; said thermosetting compound having the inherent physical property characteristics of plasticizing and becoming hydrostatic when heated to approximately 400° K. and pressurized with approximately 17.2 meganewtons/square meter pressure and thereafter becoming cured into a solid state when heated to approximately 420° K. for approximately 45 minutes;
   (h) inserting the balance mandrel into the top of the female mold cavity to close and seal the cavity;

(i) applying a vacuum to the closed and loaded cavity of from one to five mm. pressure for 15–30 minutes;

(j) heating the entire mold assembly to raise the temperature of all cavity surfaces to approximately 400° K. (261° F.) while maintaining the vacuum within the cavity;

(k) maintaining these temperature and vacuum conditions while forcing the balance mandrel downward to press the thermosetting compound with 17.2 meganewtons per square meter (2500 pounds/square inch) pressure to cause the thermosetting compound to plasticize and become hydrostatic;

(l) applying adequate force to the force mandrel in an upward direction sufficient to overcome the downward force exerted on the balance mandrel to thereby displace the thermosetting compound and expel the balance mandrel upward until the force mandrel stroke is completed;

(m) while maintaining the pressure on both mandrels, increasing the mold temperature and maintaining it at approximately 425° K. (300° F.) for approximately 45 minutes to effect curing of the molded compound;

(n) cooling the mold and removing the force and balance mandrels to recover an elongated thin-wall molded tubular body.

9. The method of claim 8 including the step of providing mating end surfaces on the balance and force mandrel of a configuration that produces an integral molded nozzle on the molded tubular body between these mandrels.

10. The method of claim 8 including the step of integrally molding a rocket nozzle at one end of the elongated tubular body while simultaneously molding tapered spiral threads on the exterior surface of the opposite end thereof.

11. The method of claim 9 wherein the tapered spiral threads formed on the tubular body exterior surface include a flank angle of 5°, a trailing flank angle of 30°, a pitch line on a 30° angle of taper, equal radii at the roots of the internal and external threads and a crest radius which is slightly larger than the root radius.

12. The method of claim 8 wherein the pressure required by the pressure mandrel to overcome the downward force exerted by the balance mandrel is approximately 3500 p.s.i.

13. The method of claim 8 wherein a thermal fluid is circulated about the female mold and interiorly of both the force and balance mandrels to achieve molding temperature.

14. The method of claim 13 wherein, for cooling the mold, the flow of thermal fluid is replaced by a flow of cooling fluid.

References Cited
UNITED STATES PATENTS

| | | | |
|---|---|---|---|
| 2,994,106 | 8/1961 | Posey | 264—102 X |
| 2,408,630 | 10/1946 | Green | 425—422 X |
| 2,514,486 | 7/1950 | Green | 425—355 X |
| 2,395,675 | 2/1946 | Luth | 264—347 X |
| 3,006,030 | 10/1961 | Paull | 264—318 |

ROBERT F. WHITE, Primary Examiner

T. P. PAVELKO, Assistant Examiner

U.S. Cl. X.R.

264—236, 325, 347; 425—355, 416, 419